(12) United States Patent
Passas-Lagos

(10) Patent No.: US 11,560,974 B2
(45) Date of Patent: Jan. 24, 2023

(54) FLUID COUPLING, IN PARTICULAR FOR FUEL LINES IN MOTOR VEHICLES, COMBINATION OF THE FLUID COUPLING WITH A CORRESPONDING COUNTERPART, AND METHOD FOR ESTABLISHING A CONNECTION OF TWO FLUID LINES

(71) Applicant: A. Kayser Automotive Systems GmbH, Einbeck (DE)

(72) Inventor: Georgios Passas-Lagos, Einbeck (DE)

(73) Assignee: A. Kayser Automotive Systems GmbH, Einbeck (DE)

( * ) Notice: Subject to any disclaimer, the term of this patent is extended or adjusted under 35 U.S.C. 154(b) by 0 days.

(21) Appl. No.: 17/522,047

(22) Filed: Nov. 9, 2021

(65) Prior Publication Data
US 2022/0154865 A1    May 19, 2022

(30) Foreign Application Priority Data
Nov. 13, 2020   (DE) .......................... 102020006979.7

(51) Int. Cl.
*F16L 37/53*    (2006.01)
*B60K 15/01*    (2006.01)

(52) U.S. Cl.
CPC .............. *F16L 37/53* (2013.01); *B60K 15/01* (2013.01); *F16L 2201/10* (2013.01)

(58) Field of Classification Search
CPC ... F16L 2201/10; F16L 37/0985; F16L 37/53; F02M 37/0017; B60K 15/01
See application file for complete search history.

(56) References Cited

U.S. PATENT DOCUMENTS

| 5,178,424 A | * | 1/1993 | Klinger | F16L 37/0985 |
| | | | | 285/319 |
| 5,226,679 A | * | 7/1993 | Klinger | F16L 37/0985 |
| | | | | 285/921 |
| 5,441,313 A | * | 8/1995 | Kalahasthy | F16L 37/0982 |
| | | | | 285/319 |
| 5,542,712 A | * | 8/1996 | Klinger | F16L 37/0987 |
| | | | | 285/259 |

(Continued)

FOREIGN PATENT DOCUMENTS

DE     102016001610 A1    8/2017

*Primary Examiner* — David Bochna
(74) *Attorney, Agent, or Firm* — Richard M. Goldberg

(57) ABSTRACT

A fluid coupling for fuel lines in motor vehicles, includes a housing having a receptacle for a counterpart, a blocking member in the receptacle and engageable behind a blocking rib of the counterpart to fix the counterpart in the receptacle, and a detection sleeve axially movable in the receptacle, and having a first engagement portion, which engages with the blocking rib to move the detection sleeve axially into a detection position, and at least one second engagement portion arranged behind the first engagement portion and, when the counterpart is pulled out, engages with the blocking rib to move the detection sleeve out of the detection position, into the initial position, and the detection sleeve includes at least one detection portion (64), received within the receptacle in the initial position so the detection portion is not visible from the outside and, in the detection position, visibly protrudes from the receptacle.

13 Claims, 7 Drawing Sheets

(56) References Cited

U.S. PATENT DOCUMENTS

| | | | | |
|---|---|---|---|---|
| 5,779,278 A | * | 7/1998 | Grooters | F16L 37/0987 |
| | | | | 285/319 |
| 5,829,792 A | | 11/1998 | Nordström | |
| 6,089,616 A | * | 7/2000 | Trede | F16L 37/0985 |
| | | | | 285/308 |
| 2002/0158465 A1 | * | 10/2002 | Tsurumi | F16L 37/0987 |
| | | | | 285/319 |
| 2010/0148491 A1 | * | 6/2010 | Takenaka | F16L 37/0985 |
| | | | | 285/24 |
| 2011/0089680 A1 | * | 4/2011 | Freter | F16L 37/0841 |
| | | | | 285/31 |
| 2017/0284583 A1 | * | 10/2017 | Eckard | F16L 37/0985 |
| 2019/0111777 A1 | * | 4/2019 | Chintalapati | B60K 15/04 |
| 2022/0178481 A1 | * | 6/2022 | Gocha | F16L 37/0885 |

\* cited by examiner

FLUID COUPLING, IN PARTICULAR FOR FUEL LINES IN MOTOR VEHICLES, COMBINATION OF THE FLUID COUPLING WITH A CORRESPONDING COUNTERPART, AND METHOD FOR ESTABLISHING A CONNECTION OF TWO FLUID LINES

BACKGROUND OF THE INVENTION

The present invention relates to a fluid coupling, in particular for fuel lines in motor vehicles, and to a combination of the fluid coupling with a corresponding counterpart. The fluid coupling can also be used for other fluid lines in motor vehicles, however. Examples include cooling-water lines, screen-wash lines, hydrogen lines, air lines and crankcase ventilation systems. Furthermore, the invention relates to a method for establishing a connection of two fluid lines.

Fuel lines in motor vehicles usually have fluid couplings for detachably connecting two fluid lines, for example to submersible pumps in fuel tanks, in order to replace a defective submersible pump. To do this, these fluid couplings are supposed to be rapidly and easily detachable and connectable.

As shown in FIG. 7, DE 10 2016 001 610 A1 discloses a fluid coupling of this kind. This plug-in coupling intended for detachably connecting the ends of two fluid lines consists of a plug-in part (not shown in FIG. 7) and a sleeve part composed of a first sleeve portion 3 and a second sleeve portion 5. When plugged in, the plug-in part is axially locked in the second sleeve portion 5 and is received so as to be rotatable about its axis, wherein the second sleeve portion 5 is in turn received in the first sleeve portion 3 in an axially locked manner and such that it can be inserted at different rotational angles about the common axis.

The second sleeve portion 5 supports an actuating element 7, which can be moved between a locked position, in which axial pull-out securing of the plug-in part is shown, and an unlocked position, in which this pull-out securing is released. To do this, a blocking member 12, which can come into engagement with a blocking rib of the plug-in part, is arranged on the elastically deformable end of a tab 11.

In the rest state of the tab 11, the blocking member 12 comes into engagement with the blocking rib (not shown) of the plug-in part. In order to release the engagement, the actuating element 7 is moved in the direction of the arrow 14 opposite to the elastic restoring force of the tab 11 in order to move the blocking member 12 radially outwards and thus out of engagement with the blocking rib.

This configuration provides the option of setting the rotational-angle position of the second sleeve portion 5 supporting the actuating element 7 relative to the plug-in part and to the first sleeve portion 3 and thus the actuating position of plug-in coupling while taking into account the respective installation conditions, with the proviso that the actuating element 7 is accessible without any obstructions. Furthermore, a window 15 is arranged in the second sleeve portion 5, which allows for the correct locking state to be visually checked.

Depending on the installation and space conditions in a motor vehicle, visually checking the locking state is, however, sometimes difficult and can only be carried out using appropriate tools, such as torches and mirrors. There is therefore a need for a fluid coupling in which a locking state can be detected in a simple manner without tools.

The object of the invention is thus to provide a detachable fluid coupling in which the correct locking state can be detected in a simple and reliable manner.

SUMMARY OF THE INVENTION

This object is achieved by the features of the independent claims. Advantageous developments are defined in the dependent claims.

One aspect of the invention is directed to a fluid coupling, in particular for fuel lines in motor vehicles, comprising:
- a housing, which comprises a (substantially cylindrical) receptacle for a counterpart or a tube part,
- a blocking member or latch or lock, which is arranged in or on the receptacle and can engage behind a blocking rib of the counterpart and thus come into engagement therewith such that the counterpart is fixed in the receptacle in the axial direction, and
- a detection sleeve, which is axially movably arranged in the receptacle and which comprises at least one first engagement portion, which, when the counterpart is inserted, can come into engagement with the blocking rib of the counterpart such that the detection sleeve is moved axially out of an initial or original position, in the insertion direction of the counterpart, into a detection position, and at least one second engagement portion, which is arranged in the insertion direction behind the first engagement portion and, when the counterpart is pulled out, can come into engagement with the blocking rib such that the detection sleeve is moved axially out of the detection position, opposite to the insertion direction of the counterpart, into the initial position, and
- wherein the detection sleeve comprises at least one detection portion, which, in the initial position, is received within the receptacle such that the detection portion is not visible from the outside (radially or perpendicularly to the tube axis) and, in the detection position, protrudes or projects from the receptacle such that the detection portion is visible from the outside.

By the detection portion only being visible in the fully locked state of the fluid coupling, a technician can ascertain, in a simple manner, whether the fluid coupling has been properly engaged. Therefore, it is possible to visually detect the locking state without tools such as torches and mirrors.

The second engagement portion is preferably elastically deformable and is in the undeformed state in the initial position of the detection sleeve and is in the elastically deformed state in the detection position, wherein the second engagement portion can only come into engagement with the blocking rib in the elastically deformed state. In other words, a radial distance between the second engagement portion and an axial center of the fluid coupling changes due to the elastic deformation such that the radial distance is shortened. In the state with the shortened radial distance, the blocking rib hits the second engagement portion of the detection sleeve, whereas, in the state without elastic deformation of the second engagement portion, there is clearance between the second engagement portion and the blocking rib.

More preferably, the detection portion is designed as a guide rail in order to axially movably guide the detection sleeve in the housing or in a complementary guide groove in the housing. Therefore, the detection portion has a dual function, i.e. axial guidance and visual detection, such that the number of parts can be reduced and the fluid coupling can have a compact size.

The first engagement portion is preferably in the form of a part circle or arc or a full circle, and/or the second engagement portion may be formed, in the insertion direction, on a rear end of the detection portion.

The blocking member is preferably movably and elastically pre-tensioned substantially orthogonally to the insertion direction and comprises an oblique surface on the proximal side, such that, when the counterpart is inserted, the blocking member is elastically deflected by the contact between a distal surface of the blocking rib of the counterpart and the oblique surface of the blocking member. In this way, the blocking member is moved or elastically deflected such that the blocking rib can pass by the blocking member in order to establish the locked state by bringing a distal surface of the blocking member into contact with a proximal surface of the blocking rib.

More preferably, the elastic restoring force of the blocking member moves the counterpart over the oblique surface opposite to the insertion direction when the blocking member is not fully inserted into the receptacle. Therefore, the counterpart is pushed out of the fluid coupling when it is not fully inserted, such that a technician can easily identify that a proper connection has not been established.

More preferably, the detection sleeve comprises at least one elastically restoring hook, which, when the detection sleeve is inserted, can come into engagement with the housing or a distal end face of the guide groove in the housing, such that the detection sleeve is axially movably secured in the housing. This state corresponds to the delivery state of the fluid coupling, i.e. the detection sleeve is already secured in the housing such that it cannot fall out and therefore does not need to be mounted at the installation site. The at least one hook is preferably arranged on at least one detection portion on a front end thereof in the insertion direction.

The hook(s) may, however, be arranged at a point on the detection sleeve other than on the detection portion. Alternatively, the housing may comprise securing means, such as elastically restoring hooks, which can come into engagement with the detection sleeve.

More preferably, the housing is formed in two parts, wherein a second housing part comprises the receptacle, the blocking member and the detection sleeve. A first housing part can be connected to the second housing part at different rotational angles and comprises an angled connecting piece. Therefore, depending on the space conditions, the rotational angle between the two housing parts can be selected such that installation without any obstructions is made possible.

The housing and/or the blocking member and/or the detection sleeve are preferably made of a thermoplastic material, such as PA6, PA6.6 or PA12. Here, the detection portion is preferably made of a thermoplastic material that has a color different from the color of the housing, in order to facilitate detection.

Furthermore, the invention is directed to a combination of a fluid coupling, as described above, and a counterpart, wherein the counterpart has a tubular shape and the blocking rib is formed as a radially projecting collar.

According to another aspect, a method for establishing a connection of two fluid lines, in particular of fuel lines in motor vehicles, is provided comprising the following steps:
  providing a housing, which is formed with a receptacle for a counterpart,
  providing the counterpart having a blocking rib,
  providing a blocking member, which is arranged in or on the receptacle and can engage behind the blocking rib of the counterpart such that the counterpart is fixed in the axial direction within the receptacle, and
  providing a detection sleeve, which is axially movably arranged in the receptacle and which comprises at least one first engagement portion, which, when the counterpart is inserted, comes into engagement with the blocking rib such that the detection sleeve is moved axially out of an initial position, in the insertion direction of the counterpart, into a detection position, and at least one second engagement portion, which is arranged in the insertion direction behind the first engagement portion and, when the counterpart is pulled out, comes into engagement with the blocking rib such that the detection sleeve is moved axially out of the detection position, opposite to the insertion direction of the counterpart, into the initial position,
  wherein the detection sleeve is formed with at least one detection portion, which, in the initial position, is received within the receptacle such that the detection portion is not visible from the outside and, in the detection position, protrudes or projects from the receptacle such that the detection portion is visible from the outside,
  inserting the counterpart into the housing, and
  detecting whether the detection portion is visible (when viewed in the radial direction or perpendicularly to the tube axis).

By the visibility of the detection portion being detected or checked after the counterpart has been inserted, the proper connection state can be ascertained in a simple, rapid and reliable manner.

BRIEF DESCRIPTION OF THE DRAWINGS

In the following, the invention will be explained in greater detail with reference to the accompanying drawings.

DETAILED DESCRIPTION

In the following, a side directed in the insertion direction of the fluid coupling is referred to as the distal side and the side opposite to the insertion direction is referred to as the proximal side.

Figure 1:
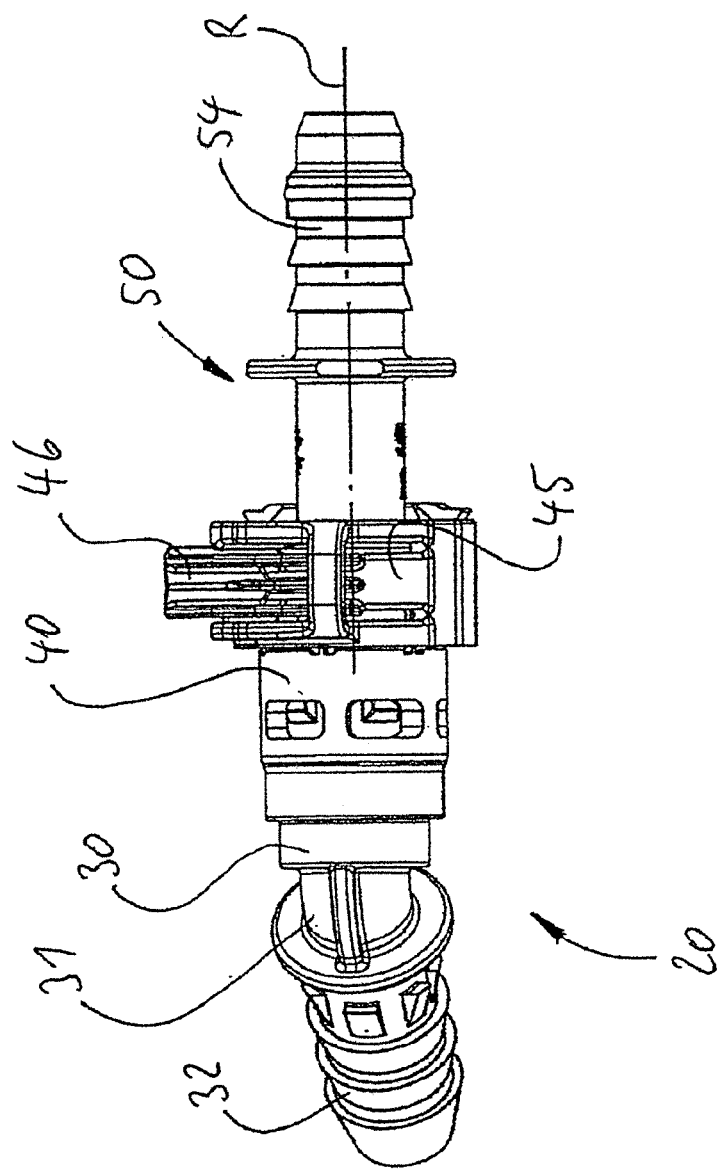
FIG. 1 is a plan view of the fluid coupling with the counterpart inserted.
Figure 2:
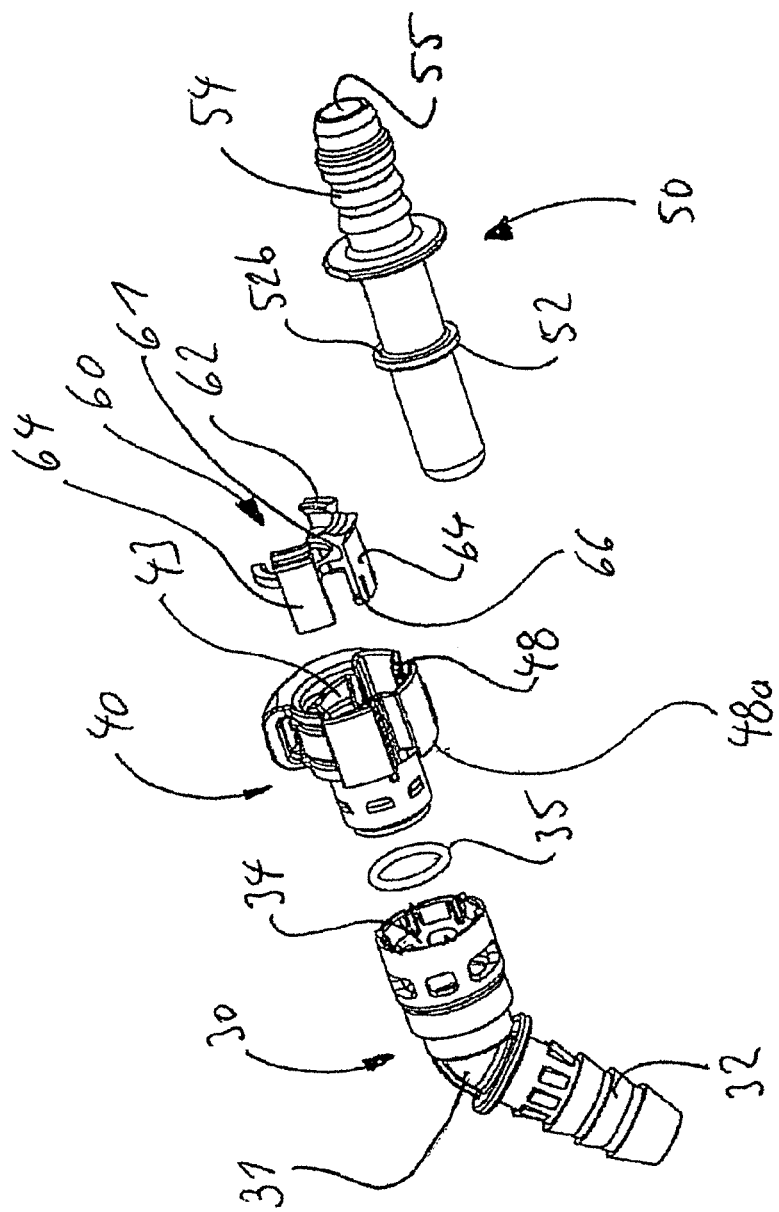
FIG. 2 is an exploded view of the fluid coupling from FIG. 1.

As shown in FIGS. 1 and 2, a fluid coupling according to the invention comprises a housing 20 and a counterpart 50 that is or can be inserted into said housing. The housing 20 is preferably composed of a first housing part 30 and a second housing part 40. Both the housing 20 and the counterpart 50 each comprise a hose connection 32, 54 at an end opposite the plug-in point. The hose connection 32, 54 comprises a plurality of circumferential ribs or projections in order to seal it against a hose that is attached thereto.

Both the housing 20 and the counterpart 50 are substantially cylindrical. In this case, the housing 20 has a substantially cylindrical receptacle 43, into which the counterpart 50 can be inserted, in order to interconnect the housing 20 and the counterpart 50 in a fluid-tight manner. The counterpart 50 is substantially tubular and has a fluid passage 55 in its interior.

Figure 5:
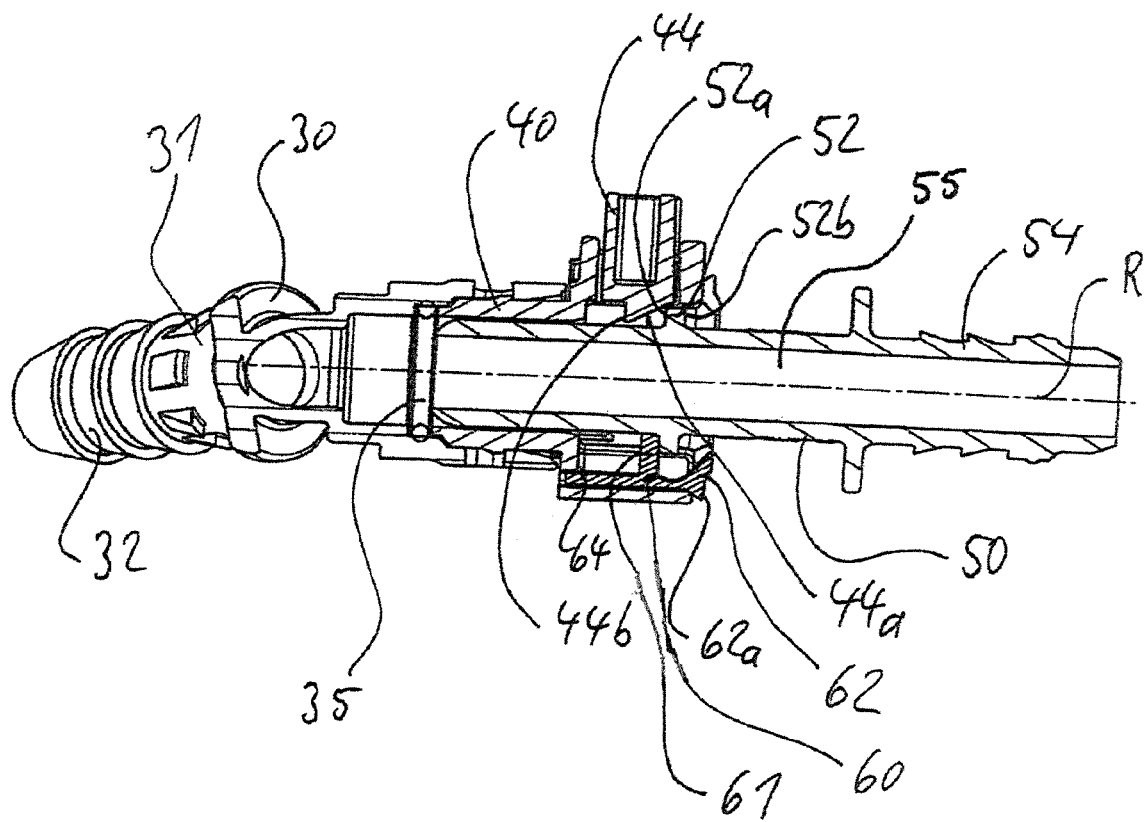
FIG. 5 is a sectional view of the fluid coupling from FIG. 1 with the counterpart not fully inserted.
Figure 6:
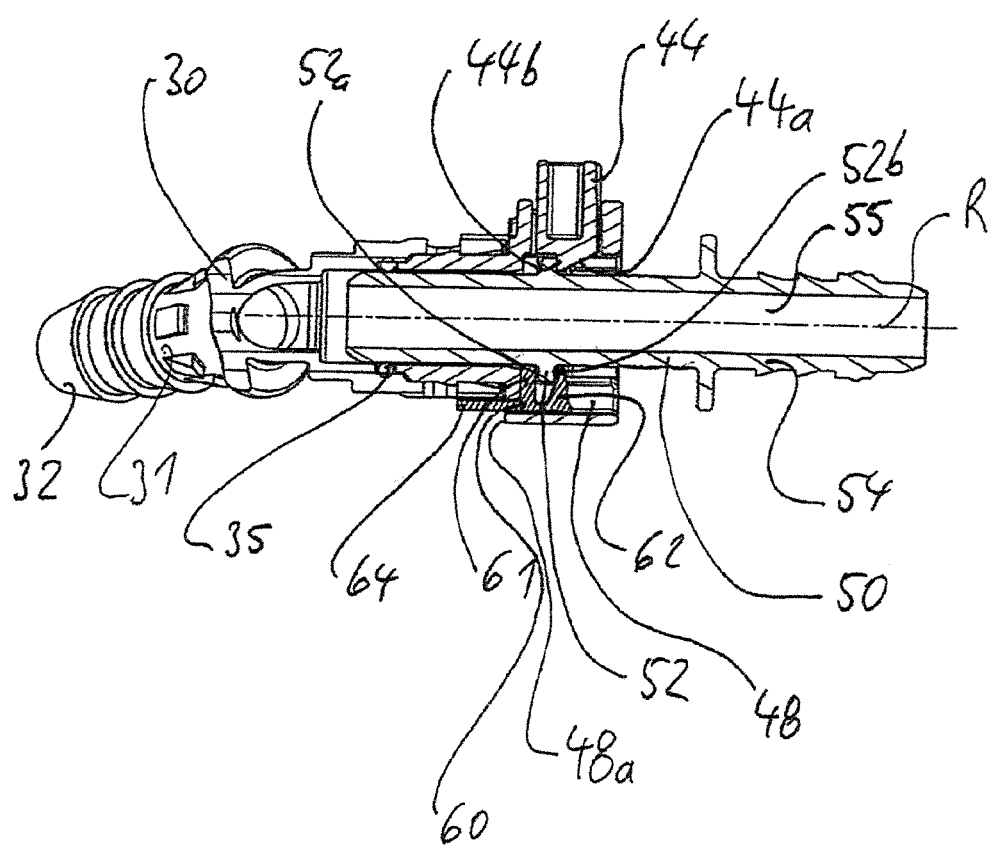
FIG. 6 is a sectional view of the fluid coupling with the counterpart fully inserted.
Figure 7:
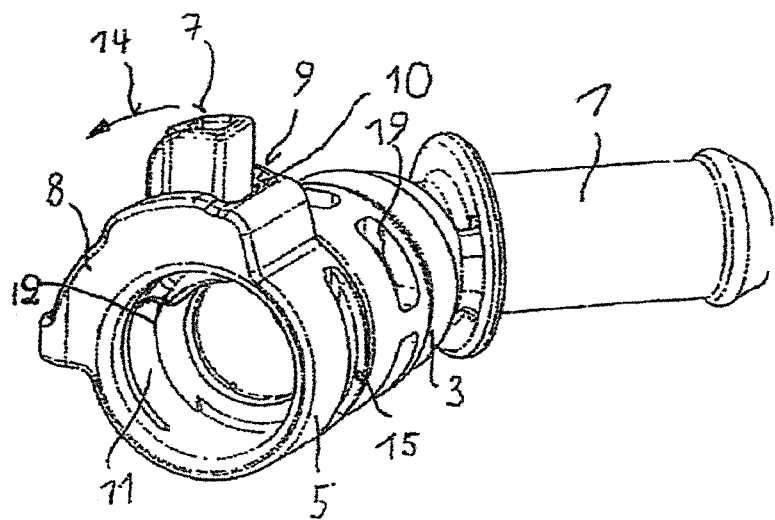
FIG. 7 shows a fluid coupling according to the prior art.

The counterpart 50 comprises a blocking rib 52 on its outer circumference, in order to come into engagement with a blocking member 44 (not shown in FIGS. 1 and 2). The blocking member 44, which is discussed in greater detail below with reference to FIGS. 5 and 6, is arranged at the end of an elastically deformable tab 45. The tab 45 is curved and extends over a part circle of the circumference of the second housing part 40. Furthermore, a handle 46 is arranged at the end of the elastic tab 45, in order to elastically deform the tab 45 from the tube interior outwards such that the engagement between the blocking member 44 and the blocking rib 52 is released.

Although the blocking member 44 is substantially radially brought into engagement with the blocking rib 52 in an elastic manner by means of the tab 45, the blocking member 44 can also be radially pre-tensioned in another manner, for example by a spring.

Furthermore, an O-ring is arranged as the seal 35 in order to provide sealing between the first housing part 30 and the counterpart 50. However, the invention is not limited to this. Instead of an O-ring, any other seal, such as a molded seal, can also be used.

The second housing part 40 comprises the substantially cylindrical receptacle 43 for receiving the substantially tubular counterpart 50. Furthermore, a plurality of guide grooves 48 are arranged on the circumference of the housing part 40, this being three guide grooves 48 in the example in FIG. 2. However, the invention is not limited to the arrangement of three guide grooves 48, but instead just one guide groove 48 can be arranged or two or more than three guide grooves 48 can be arranged.

A detection sleeve 60 can be inserted into the receptacle 43 of the second housing part 40. This detection sleeve 60 is designed to be substantially circular or part-circular around the center of the tube axis and comprises a plurality of detection portions 64. The detection portions 64 are elongate and extend over the circumference of the circle shape or part-circle shape of the detection sleeve 64 in the axial direction and thus in the longitudinal direction of the tube axis. Furthermore, the detection portions 64 are designed as guide rails in order to be guided in the guide grooves 48 in the second housing part 40. In this way, the detection sleeve 60 is movable within the receptacle 43 of the second housing part 40 in the axial direction of the fluid coupling.

The detection portion 64 or the guide rail preferably has a substantially rectangular or arcuate cross section for the guidance within the guide groove 48. However, the invention is not limited to this. The cross sections of the detection portion 64 and the guide groove 48 may also have a spherical cross section, a round cross section, or a triangular or pentagonal or elliptical cross section, for example.

Furthermore, at least one of the detection portions 64 comprises, at its distal end, at least one hook 66, preferably a pair of hooks 66 on each lateral side. When the detection sleeve 60 is inserted, the hook(s) 66 come into engagement with a distal end face 48a of the guide groove 48 of the second housing part 40, such that the detection sleeve 60 is secured inside the receptacle 43 of the second housing part 40 and cannot fall out. It is only possible to move the detection sleeve 60 in the axial direction of the fluid coupling. In order to remove the detection sleeve 60, the hooks 66 have to be elastically deformed in order to release the engagement between the hook 66 and the distal end face 48a of the guide groove 48. The hook(s) 66 may, however, also be arranged at a point on the detection sleeve 60 other than on the detection portion 64. Alternatively, the housing 20 may comprise securing means, such as elastically restoring hooks, which can come into engagement with the detection sleeve 60.

As explained below in particular with reference to FIGS. 5 and 6, the detection sleeve 60 is thus movable between an initial or original position and a detection position within the receptacle 43 in the axial direction of the second housing part 40. In the original position, the hooks 66 abut the distal end face 48a. In the detection position, however, the detection portions 64 project from the guide groove 48 in the axial or distal direction such that the detection portions 64 protrude from the receptacle 43 and are visible from the outside, whereas they are concealed by the guide groove 48 and not visible in the original position.

The detection sleeve 60 is now explained in greater detail with reference to FIG. 3. As already described, the detection sleeve 60 comprises a plurality of detection portions 64, and in the embodiment in FIG. 3 comprises three elongate detection portions 64, which are distributed over the circumference of the detection sleeve 64. One of the detection portions 64, in the example in FIG. 3 the central detection portion 64, comprises the pair of hooks 66.

Furthermore, the detection sleeve 60 comprises a first engagement portion 61, which is offset radially inwards relative to the detection portions 64 and is in the form of a part circle. However, the invention is not limited to this. The first engagement portion 61 may also designed as a full circle. The circumference of the part circle or full circle of the first engagement portion 61 is coordinated with the circumference of the blocking rib 52 of the counterpart 50 such that, when the counterpart 50 is inserted, the blocking rib 52 hits the first engagement portion 61 and the detection sleeve 60 is moved in this way.

A second engagement portion 62 is formed at a proximal end of the detection sleeve 60, i.e. at an axial end of the detection sleeve 60 opposite the hooks 66. This second engagement portion 62 is designed as an extension of the detection portions 64 in the proximal direction. In the case of the embodiment in FIG. 3, three second engagement portions 62 are thus formed. An inner circumference of the radially inwardly projecting tips 62a of the second engagement portions 62 is coordinated with the circumference of the blocking rib 52 of the counterpart 50 such that the tips 62a of the second engagement portions 62 do not prevent the blocking rib 52 from moving in the axial direction of the fluid coupling.

The tips 62a of the second engagement portions 62 are movable or deformable radially inwards in an elastic manner, however, in order to come into engagement with the blocking rib 52 of the counterpart 50, as explained below with reference to FIGS. 5 and 6.

Figure 3:
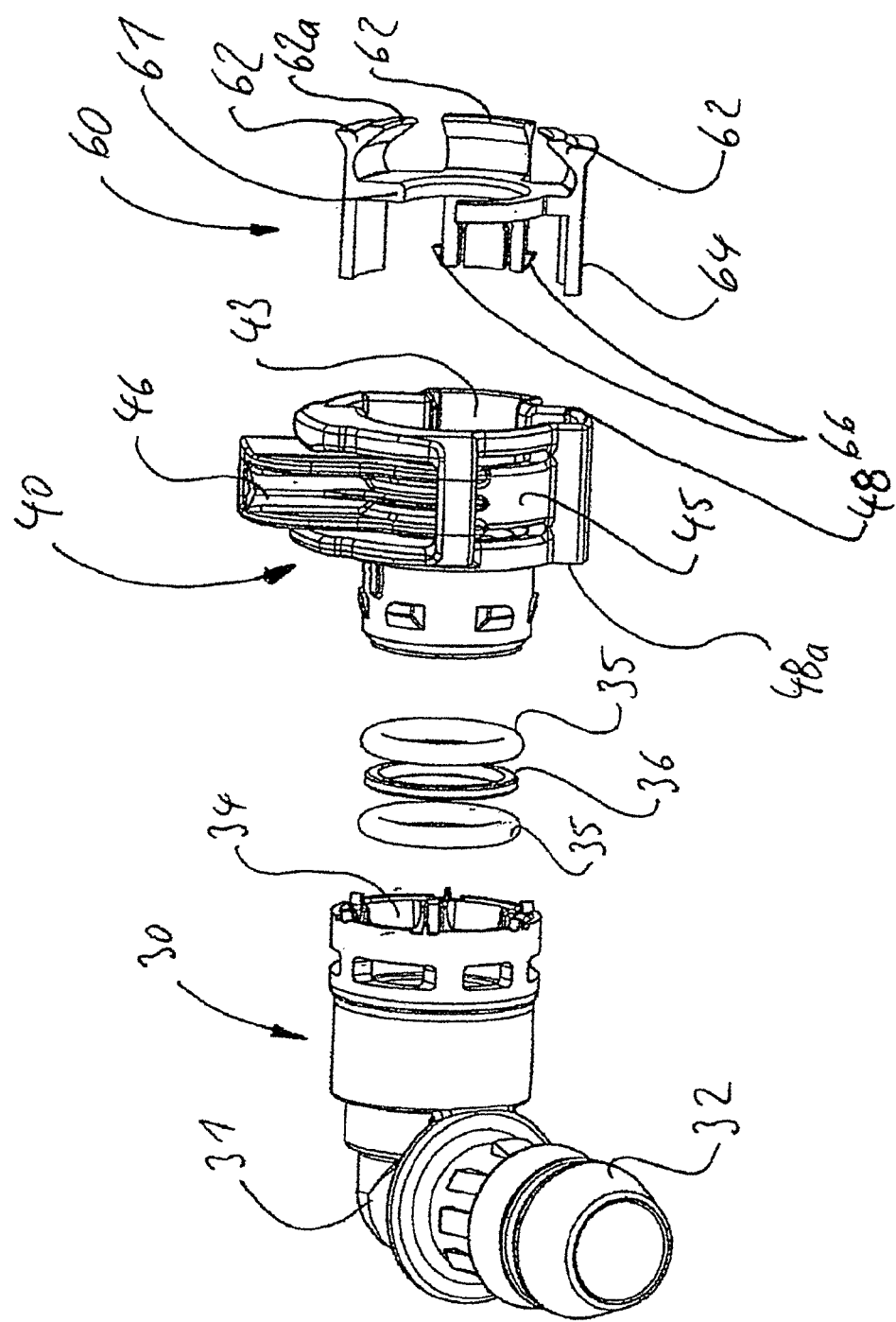
FIG. 3 shows a modification to the fluid coupling from FIG. 2.

Furthermore, FIG. 3 shows that, in this embodiment, two seals 35, preferably O-rings, are arranged and a washer 36 is arranged between these seals. Arranging two seals 35 rather than just one seal 35, as shown in the embodiment in FIG. 2, has the advantage of improved sealing and in particular increased security in the event of a seal 35 falling out, since, in this case, the second seal 35 can provide the complete sealing of the fluid coupling.

Figure 4:
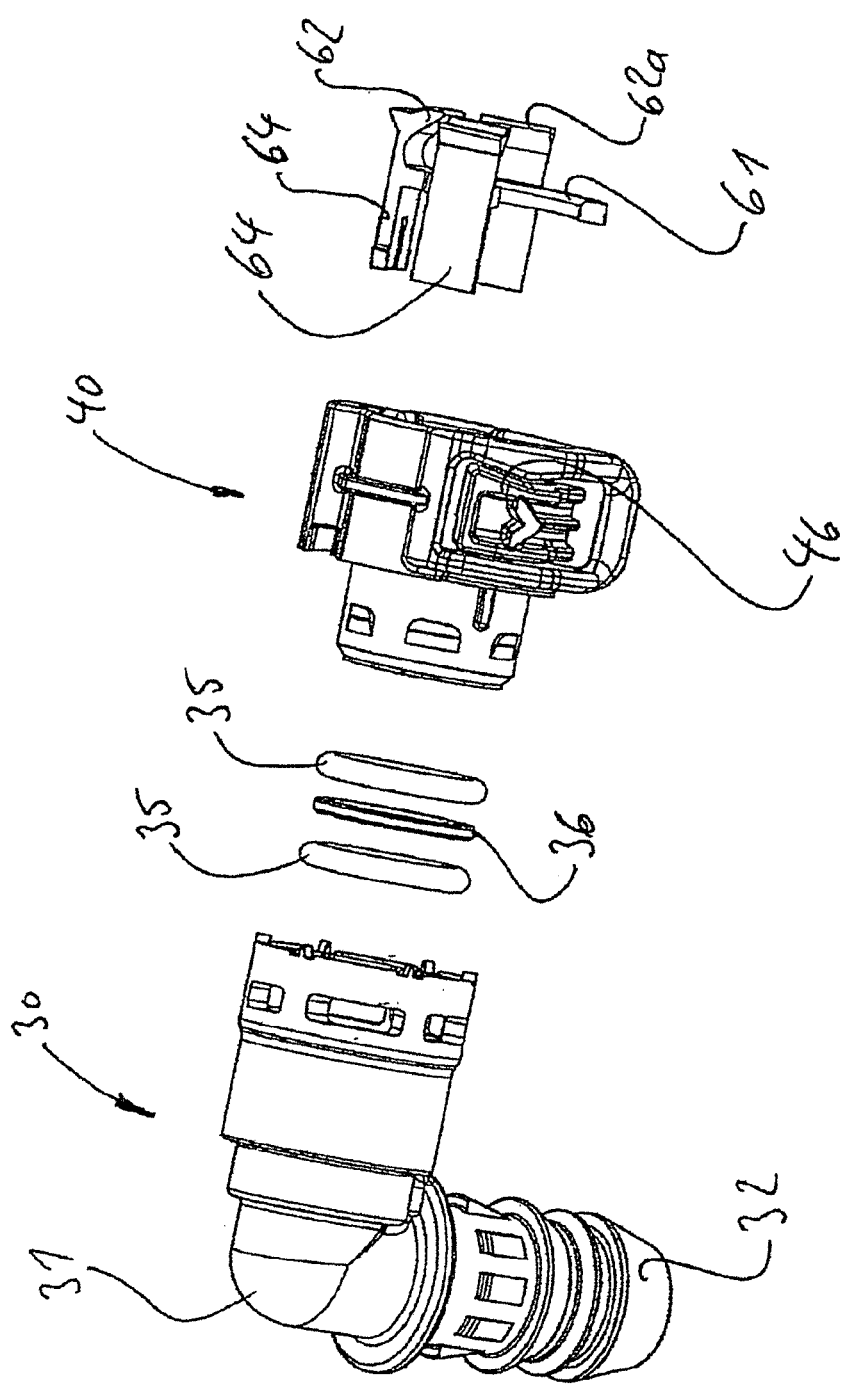
FIG. 4 shows the modification to the fluid coupling from FIG. 3 rotated by 90 degrees.

FIG. 4 shows the embodiment from FIG. 3 comprising the two seals 35, wherein the housing 20 of the fluid coupling has been rotated by approximately 90 degrees.

The functions of the fluid coupling are now explained in greater detail with reference to FIGS. 5 and 6. In FIG. 5, the counterpart 50 is not fully inserted into the housing 20 of the fluid coupling. In this position, the detection sleeve 60 is in the initial or original position. In FIG. 6, however, the counterpart 50 is fully inserted into the housing 20 of the fluid coupling and, in this position, the counterpart 50 is locked to the housing 20 and the detection sleeve 60 is in the detection position.

As shown in FIG. 5, the blocking rib 52 of the counterpart 50 passes the second engagement portion 62 when the counterpart 50 is inserted into the receptacle 43 of the second housing part 40 without coming into engagement with said engagement portion. The blocking rib 52 hits the first engagement portion 61, however, and when the counterpart 50 is moved further or when the counterpart 50 is inserted into the receptacle 43, the detection sleeve 60 is thus axially moved in the insertion direction by the engagement of the blocking rib 52 with the first engagement portion 61.

Furthermore, the blocking member 44 has an oblique surface 44a, which is arranged on the proximal side of the blocking member 44 and is thus directed towards the blocking rib 52. When the counterpart 50 is inserted, a distal surface 52a of the blocking rib 52 hits the oblique surface 44a of the blocking member 44 in order to elastically deform the blocking member 44 radially outwards such that the blocking rib 52 of the counterpart 50 passes by the blocking member 44 and a proximal surface 52b of the blocking rib 52 can come into engagement with a distal face or surface 44b of the blocking member 44, as shown in FIG. 6. In this way, the blocking member 44 locks the counterpart 50 by the engagement with the blocking rib 52.

As already described above with reference to FIGS. 1 and 2, the tab 45 extends over a part circle of the circumference of the second housing part 40 and has the blocking member 44 at its free end. The blocking member 44 is thus radially movably and elastically pre-tensioned such that, when the counterpart 50 is inserted into the receptacle 43, the oblique surface 44a of said blocking member hits the blocking rib 52. Although the blocking member 44 is substantially radially brought into engagement with the blocking rib 52 in an elastic manner by means of the tab 45, the blocking member 44 can also be radially pre-tensioned in another manner, for example by a spring.

As also shown in FIG. 5, the detection sleeve 60 is in the not fully inserted state of the counterpart 50 in the original position, in which the detection portion 64 is substantially fully received in the guide groove 48, such that the detection portion 64 is not visible from the outside.

The expression "not visible from the outside" means that the lateral surface of the detection portion 64 is not visible when the fluid coupling is viewed in the radial direction or perpendicularly to the tube axis R, although a distal tip of the detection portion 64 is visible when the fluid coupling is viewed in the axial direction from the distal side. The visibility of this small distal tip is not intended to be taken into consideration here, however, since it could only be detected using a mirror and torch in a confined installation space in a motor vehicle, but this is exactly what is intended to be avoided.

When the counterpart 50 is fully inserted into the receptacle 43 of the second housing part 40, the counterpart 50 is locked in the second housing part 40 by the engagement of the proximal surface 52b of the blocking rib 52 with the distal surface 44b of the blocking member 44. Furthermore, the detection sleeve 60 is moved in the insertion direction by the engagement between the blocking rib 52 and the first engagement portion 61, such that the detection portion(s) 64 project(s) distally from the guide groove 48 in the insertion direction in order to be visible from the outside. In this way, a technician can visually detect the fully locked state of the fluid coupling in a simple manner.

As also shown in FIG. 6, the second engagement portion 62 is deformed radially inwards by the engagement with the guide groove 48 in order to come into engagement with the proximal face or surface 52b of the blocking rib 52. In this way, by unlocking the fluid coupling via the handle 46 (see FIG. 1), which brings the blocking member 44 out of engagement with the blocking rib 52, the detection sleeve 60 can be moved opposite to the insertion direction into the original position by the second engagement portion 62 abutting the blocking rib 52 when the counterpart 50 is pulled out of the receptacle 43.

In the original position, the second engagement portion 62 is elastically deformed radially inwards in order to clear the path for guiding out the counterpart 50 comprising the blocking rib 52. In other words, as shown in FIG. 5, the second engagement portion 62 deforms radially outwards in order to no longer be in the way of the blocking rib 52 when the counterpart 50 is pulled out of the receptacle 43.

Preferably, both the housing 20 and the detection sleeve 60 are made of a thermoplastic material, such as PA 6, PA 6.6 or PA 12. In this case, the housing 20 and the detection sleeve 60 are preferably different colors in order to facilitate the visual detection of the detection portion 64. For example, the housing 20 may be made of a light-colored plastics material, while the detection sleeve 60 may be made of a dark-colored plastics material, or vice versa.

Although the detection sleeve 60 described here is in the part-circle shape with the detection portions 64 arranged over the circumference, the detection sleeve may also be designed as a tubular sleeve, wherein a portion that is at the front or is distal in the insertion direction acts as a detection portion.

Although the embodiments shown here have a two-part housing 20 of the fluid coupling, a one-part or three-part or four-part housing can also be used.

Although the blocking member 44 described here is designed to comprise the handle 46 at the end of the elastically deformable tab 45, another blocking member, such as a spring-loaded blocking member, can also be used.

Although the housing 20 and the counterpart 50 described here comprise the hose connection 32, 54 for the connection to a rubber hose, these may also be designed as a connecting piece of a fuel pump or a fuel filter or may comprise another type of hose or tube connection.

Although the fluid coupling described here is primarily described for fuel lines, the use is not limited thereto, but instead it can also be used for other fluid lines, such as for cooling-water lines, screen-wash lines, hydrogen lines, air lines and crankcase ventilation systems.

LIST OF REFERENCE CHARACTERS

1 Sleeve part
3 First sleeve portion
5 Second sleeve portion
7 Actuating element
8 Web
9 Web
10 Recess
11 Tab
12 Blocking member
14 Arrow
15 Window
20 Housing
30 First housing part
31 Angled connecting piece
32 Hose connection 34 Receptacle
35 Seal
36 Washer
40 Second housing part
43 Receptacle
44 Blocking member
44a Oblique surface
44b Distal surface
45 Tab
46 Handle
48 Guide groove
48a Distal end face
50 Counterpart
52 Blocking rib
52a Distal surface
52b Proximal surface
54 Hose connection
55 Fluid passage
60 Detection sleeve
61 First engagement portion
62 Second engagement portion
62a Tip or projection
64 Detection portion
66 Hook
R Tube axis

What is claimed is:

1. Fluid coupling for fuel lines in motor vehicles, comprising:
a housing which comprises a receptacle for a counterpart,
a blocking member arranged in or on the receptacle and is adapted to engage behind a blocking rib of the counterpart such that the counterpart is fixed in the receptacle in the axial direction, and
a detection sleeve axially movably arranged in the receptacle and which comprises:
at least one first engagement portion, which, when the counterpart is inserted, is adapted to come into engagement with the blocking rib such that the detection sleeve is moved axially out of an initial position, in the insertion direction of the counterpart, towards a detection position, and
at least one second engagement portion, which is arranged in the insertion direction behind the first engagement portion and, when the counterpart is pulled out, is adapted to come into engagement with the blocking rib such that the detection sleeve is moved axially out of the detection position, opposite to the insertion direction of the counterpart, towards the initial position, and
wherein the detection sleeve comprises at least one detection portion, which, in the initial position, is received within the receptacle such that the detection portion is not visible from the outside and, in the detection position, protrudes from the receptacle such that the detection portion is visible from the outside.

2. Fluid coupling according to claim 1, wherein the at least one second engagement portion is elastically deformable and is in an undeformed state in the initial position of the detection sleeve and is in an elastically deformed state in the detection position, wherein the at least one second engagement portion is adapted to only come into engagement with the blocking rib in the deformed state.

3. Fluid coupling according to claim 1, wherein the detection portion is designed as a guide rail in order to axially movably guide the detection sleeve in the housing.

4. Fluid coupling according to claim 1, wherein at least one of:

a) the at least one first engagement portion is in the form of one of a part circle or a full circle, and
b) the second engagement portion is formed, in the insertion direction, on a rear end of the detection portion.

5. Fluid coupling according to claim 1, wherein the blocking member is movably and elastically pre-tensioned substantially orthogonally to the insertion direction and comprises an oblique surface, such that, when the counterpart is inserted, the blocking member is elastically deflected by contact between the blocking rib of the counterpart and the oblique surface.

6. Fluid coupling according to claim 5, wherein an elastic restoring force of the blocking member moves the counterpart over the oblique surface opposite to the insertion direction when the blocking member is not fully inserted into the receptacle.

7. Fluid coupling according to claim 1, wherein one of:
the detection sleeve comprises at least one elastically restoring hook, which, when the detection sleeve is inserted, is adapted to come into engagement with the housing, or
the housing comprises elastically restoring hooks, which are adapted to come into engagement with the detection sleeve, such that the detection sleeve is axially movably secured in the housing.

8. Fluid coupling according to claim 7, wherein the hooks are arranged on the at least one detection portion, in the insertion direction, on the front end thereof.

9. Fluid coupling according to claim 1, wherein the housing is formed in two parts, wherein a second housing part comprises the receptacle, the blocking member and the detection sleeve and a first housing part is adapted to be connected to the second housing part at various rotational angles and comprises an angled connecting piece.

10. Fluid coupling according to claim 9, wherein at least the detection portion of the detection sleeve has a color different from the color of the second housing part.

11. Fluid coupling according to claim 1, wherein at least one of the housing, the blocking member, and the detection sleeve are made of a thermoplastic material.

12. Combination of a fluid coupling according to claim 1, and a counterpart, wherein the counterpart is formed in a tubular shape and the blocking rib is formed as a radially projecting collar.

13. Method for establishing a connection of two fluid lines in motor vehicles, comprising the steps of:
providing a housing formed with a receptacle for a counterpart,
providing a counterpart having a blocking rib,
providing a blocking member arranged in or on the receptacle and is adapted to engage behind the blocking rib of the counterpart such that the counterpart is fixed in the axial direction within the receptacle, and
providing a detection sleeve axially movably arranged in the receptacle and which comprises:
at least one first engagement portion, which, when the counterpart is inserted, comes into engagement with the blocking rib such that the detection sleeve is moved axially out of an initial position, in the insertion direction of the counterpart, into a detection position, and
at least one second engagement portion, which is arranged in the insertion direction behind the first engagement portion and, when the counterpart is pulled out, comes into engagement with the blocking rib such that the detection sleeve is moved axially out of the detection position, opposite to the insertion direction of the counterpart, into the initial position, wherein the detection sleeve is formed with at least one detection portion, which, in the initial position, is received within the receptacle such that the detection portion is not visible from the outside and, in the detection position, protrudes from the receptacle such that the detection portion is visible from the outside, inserting the counterpart into the housing, and detecting whether the detection portion is visible.

* * * * *